United States Patent [19]

Farkas

[11] Patent Number: 5,655,578

[45] Date of Patent: Aug. 12, 1997

[54] CONTROL SYSTEM FOR FILLING OF TANKS WITH SATURATED LIQUIDS

[76] Inventor: Edward J. Farkas, 34 Lyonsgate Dr., Downsview, Ontario, Canada, M3H 1C8

[21] Appl. No.: 613,532

[22] Filed: Mar. 11, 1996

Related U.S. Application Data

[63] Continuation of Ser. No. 212,811, Mar. 15, 1994, abandoned.

[51] Int. Cl.$^6$ ................................................. F17C 13/00
[52] U.S. Cl. ........................... 141/59; 141/4; 141/5; 141/7; 141/45; 62/50.4
[58] Field of Search ................ 141/4, 5, 7, 44–46, 141/59, 95; 62/50.1, 50.2, 50.4

[56] References Cited

U.S. PATENT DOCUMENTS

| | | | |
|---|---|---|---|
| 3,756,291 | 9/1973 | McGahey et al. | 141/45 |
| 3,797,262 | 3/1974 | Eigenbrod | 141/5 X |
| 3,874,427 | 4/1975 | Tiggelbeck | 141/290 X |
| 4,010,779 | 3/1977 | Pollock et al. | 141/44 |
| 4,887,857 | 12/1989 | VanOmmeren | 141/5 X |
| 5,151,111 | 9/1992 | Tees et al. | 141/59 X |
| 5,291,922 | 3/1994 | Martin et al. | 141/59 |
| 5,351,725 | 10/1994 | Suthergreen et al. | 141/95 X |
| 5,353,849 | 10/1994 | Sutton et al. | 141/44 |
| 5,385,178 | 1/1995 | Bedi | 141/59 |

Primary Examiner—J. Casimer Jacyna
Attorney, Agent, or Firm—Flehr, Hohbach, Test, Albritton & Herbert

[57] ABSTRACT

The invention described in the patent is an automatic control system which provides monitoring, supervision, and control of the process of filling of a tank or container with a liquid, where at the temperature of operation the vapor pressure of the liquid is at or above atmospheric pressure. The invention provides an improved method of carrying out the process of filling of tanks with liquids such as ammonia, chlorine, propane, liquefied petroleum gas or any other liquid with high vapor pressure at the temperature of operation. The main advantage provided by the apparatus and method of the present invention is that an improved means is included for automatically stopping the filling process at the correct point, so as to avoid a possibly hazardous overfilled condition. One of the methods currently in use requires a mechanical valve which senses liquid level in the tank and is supposed to close so as to stop flow to the tank when the liquid has reached the maximum allowable level. The mechanical valve may malfunction and allow overfilling of the tank, and the fact that the valve is malfunctioning may not be readily apparent. The present invention does not require a mechanical valve of the type described above. Further there is a self-checking and self-monitoring capability so that users of the apparatus and method are warned of any malfunction.

7 Claims, 4 Drawing Sheets

CONTROL SYSTEM FOR FILLING OF TANKS WITH SATURATED LIQUIDS

This is a continuation of application Ser. No. 08/212,811 filed Mar. 15, 1994, now abandoned.

FIELD OF THE INVENTION

The invention relates to equipment which is used in commerce and industry. The equipment is used for handling liquids, and specifically is used for filling of tanks or containers with liquids. The equipment is designed and intended for use with liquids which have a vapor pressure equal to or higher than atmospheric pressure, at the temperature at which the liquids are handled. Filling of tanks or containers with such liquids requires specialized techniques. The techniques currently known to those skilled in the art have serious deficiencies, especially in such applications as filling of fuel tanks of motor vehicles which utilize propane or liquefied petroleum gas (LPG) as fuel. The present invention provides an improved apparatus and an improved method for filling of tanks or containers in this application and in other applications where liquids with vapor pressures equal to or higher than atmospheric pressure must be handled.

BACKGROUND

The invention relates to the handling of liquids in industrial and commercial processes. More specifically the invention relates to filling of tanks with liquids. One example of a case where tanks must be filled is the filling or refueling of a motor vehicle which is powered by a fuel which is dispensed to the vehicle in liquid form.

Any liquid expands when it is warmed. Consider a completely closed tank which is nearly filled with a liquid. Suppose the tank is warmed, for example by the sun shining on it. The liquid in the tank expands, and may come to completely fill the available internal volume of the tank. If there is further warming, and the liquid has no further available space within the tank into which it can expand, the liquid develops extremely large forces against the tank walls and the tank may split apart, releasing the liquid in an uncontrolled manner. Such a release is obviously undesirable, especially if the liquid is toxic or flammable.

Every liquid has associated with it a "vapor pressure" which is a function of temperature. The phrase "vapor pressure" has a very specific meaning well known to those skilled in the arts of chemistry and chemical engineering. It is convenient to divide liquids into two classes:

1. Class 1 liquids are those liquids which have a vapor pressure below atmospheric pressure, at all normal outdoor temperatures.
2. Class 2 liquids are those liquids which have a vapor pressure above atmospheric pressure at any outdoor temperature.

Vapor pressure is an intrinsic property of a given liquid at a given temperature and can be thought of as an outward force exerted on the surroundings, by the liquid.

Atmospheric pressure is typically in the area of 101.325 kiloPascals, or 101.325 kPa. This pressure can also be expressed as 14.696 pounds force per square inch absolute or 14.696 psia.

Consider a warm summer day when the outdoor temperature is 30° C. (86° F.). An open dish containing a Class 1 liquid is placed outdoors. Examples of Class 1 liquids are water and gasoline. The Class 1 liquid in this experiment evaporates in a relatively gradual process.

Now consider the same experiment, this time performed with a Class 2 liquid. The Class 2 liquid would be seen to be boiling and in a relatively short time all the liquid would have disappeared. Depending on the liquid used in the experiment, the boiling might be extremely rapid and violent, or might be relatively slow.

A Class 1 liquid can be stored in a tank which is not hermetically sealed. The tank can be essentially open to the atmosphere, and the pressure inside the tank can be essentially equal to atmospheric pressure. On a warm day some of the liquid may evaporate and some of the vapor may escape from the tank. But the bulk of the liquid remains in the tank. If the liquid expands and completely fills the tank, on further warming excess liquid can escape from the tank, because the tank is not hermetically sealed, rather than building up a large force inside the tank.

On the other hand, a Class 2 liquid must be stored in a tank which is completely closed and hermetically sealed. If there was any communication with the general outdoor environment, the liquid in the tank would boil off and after a time all the liquid in the tank would be lost. It follows then that if there is thermal expansion of the liquid, there must be adequate space within the tank. If the tank becomes completely full with liquid, and if there is then further warming, since there is no way for the liquid to escape very large forces are developed and the tank will split open.

To avoid disasters that could result from splitting of tanks in this manner, the following procedure is used and is well known to those skilled in the art:

When filling tanks with Class 2 liquids, the tank is only partly filled. Enough space is left free of liquid so that in any subsequent warming process, such as due to the sun shining on the tank, thermal expansion of the liquid still does not result in the internal volume of the tank being completely full of liquid. There is still some space in the tank that is free of liquid.

The remainder of the present document deals only with Class 2 liquids. All further reference to "liquid" or "liquids" should be understood to mean Class 2 liquids, as defined above.

When a Class 2 liquid is in a completely closed and hermetically sealed tank, in general there is a portion of the tank which contains liquid, and there is another portion of the tank which does not contain liquid. In the latter portion of the tank is found vapor which has been produced by boiling of the liquid. In other words, there is a vapor space in the tank and a liquid space. Both spaces contain the same chemical substance. In one case the chemical substance is present in the liquid form, and in the other case the same chemical substance is present in the vapor form. There is no air in the tank.

The pressure in the tank is equal to the vapor pressure of the chemical substance, at the temperature of the tank. If the tank is warmed, for example by the sun shining on it, the contents of the tank will be warmed. The vapor pressure, an intrinsic property of the chemical substance, increases with temperature, and therefore the pressure in the tank will increase. As long as there is still some vapor in the tank, the increase in pressure in the tank is relatively moderate and the tank can contain the increased pressure.

When both liquid and vapor coexist in the tank, both the liquid and vapor phases are at the same temperature and pressure, or very nearly at the same temperature and pressure. The two phases are said to be in equilibrium with each other. If there is the slightest warming, additional liquid boils off. If there is the slightest cooling, some vapor condenses into the liquid. Boiling of the liquid is incipient, and condensation of the vapor is incipient. The liquid and the vapor are each said to be "saturated". Handling of saturated or nearly saturated liquid creates difficulty, because of the ease with which vapor is formed. For example, vapor can form in pumps conveying saturated liquid, which may slow the pumping action and/or damage the pump.

The terms saturated liquid and saturated vapor are standard and accepted terms well known to those skilled in the art of chemical engineering.

The situation inside a tank containing a Class 2 liquid, with the vapor phase and the liquid phase in a dynamic equilibrium with each other, and with no air present, is a situation which is not met in everyday life. Failure to understand the behavior of this type of system is the root cause of the Three Mile Island Nuclear Power Plant disaster in 1979. Also in 1979 there was a railroad accident in Mississauga, Ontario, involving cars containing chlorine. Failure of the authorities to understand the behavior of a Class 2 liquid resulted in hundreds of thousands of people being unnecessarily kept away from their homes, and thousands of businesses being unnecessarily closed, for a lengthy period. The behavior of the vapor and liquid phases inside a tank containing a Class 2 material must be fully understood in order to understand the apparatus and method of the present invention. Especially, it must always be kept in mind that there is no air inside the tank.

In industrial practice, typically there is a supply tank from which liquid is drawn. This liquid is moved by pump or by other means to a tank which is to be filled. While the tank to be filled may initially be essentially empty, there usually would be some liquid and therefore some vapor in the tank. When at least a portion of the internal volume of the tank is occupied by vapor, it is possible to force further liquid into the tank, which results in vapor in the tank being condensed into the liquid phase in the tank. However in order to proceed more easily and more rapidly with the filling process, vapor from the tank to be filled can be returned to the supply tank, during the filling process. The vapor flows from the tank being filled, to the supply tank, via a "vapor return line".

The volume of vapor being returned is essentially equal to the volume of liquid entering the tank which is being filled. This condition defines a true or full-fledged vapor return system.

The apparatus and the method of the present invention rely on and require use of a very small flow of vapor from the tank being filled, back to the supply tank, during the filling process. The volume of vapor which returns to the supply tank is a very small fraction of the volume that would return in a full-fledged vapor return system.

This small flow of vapor can be referred to as a bleed flow or auxiliary flow. It can be regarded as a signal flow, or the small-diameter line which carries this small flow can be regarded as a signal line which carries information about the liquid level within the tank being filled.

From the previous discussion of thermal expansion of liquids, it is obvious that when filling the completely closed and hermetically sealed tanks which are used with the subject liquids, namely Class 2 liquids, extreme care is needed to stop the filling process at the correct point, so as to avoid overfilling of the tank. An overfilled tank may still have some vapor space in the tank, i.e., space which is free of liquid, but this space is not enough to accommodate possible future thermal expansion of the liquid.

The maximum allowed amount of liquid in a given tank can be expressed as a percentage of the total internal volume of the tank. The allowed percentage is typically in the range of 50 to 80% of the internal volume of the tank. The exact value depends on the liquid being handled. At the time a tank is filled, if the liquid that is being fed to the tank is unusually cold, the allowed percentage, otherwise referred to as filling ratio or filling density, properly should be even less than the normal value.

Various methods are currently in use to stop the process of filling a tank with liquid, at the correct point, so that the tank is not overfilled. These methods include:

a. A mechanical valve is permanently installed inside the tank. The valve is on the inlet line or feed line. This valve senses the liquid level and closes when the correct liquid level has been reached in the tank.

b. A liquid level sensor can be placed inside the tank. When the correct liquid level is reached, a signal is sent to a controller, which in turn stops the flow of liquid to the tank.

c. To quote from "Handbook—Butane-Propane Gases", Third Edition, 1942, page 104, in a method which is applied to "tank trucks", "there is a fixed outage tube in each tank, that extends from the top of the shell to the correct point to indicate when loading is finishing, this tube having a valve through which vapor will vent until the liquid reaches the bottom of the tube. The valves are then shut and the liquid and vapor hose disconnected . . .".

d. If the tank is removable from its usual place of use, and if it is not too large, it can be placed on a scale during filling. The maximum allowable weight of tank and contents is known. The weight of the tank and contents is observed on the scale during the filling operation. When the correct weight has been reached, the filling process is stopped.

There are various disadvantages and deficiencies to the above methods, including:

a. The mechanical valve could malfunction, and allow a larger than correct amount of liquid to enter the tank. It would be very difficult for the user of this method to be aware that tanks are being overfilled.

b. Some sensors would require an electrical connection to the tank. To make this connection each time the tank is filled adds to the complexity of the filling process, and to the hazard, if the liquid being handled is flammable. Again in case of malfunction, the tank might be overfilled without the user being aware of it.

c. The method as described in the reference does not provide automatic operation and therefore is only suitable for use with a trained operator in attendance. In filling of large tanks, which is the subject under discussion in the quoted reference, the feed rate is small relative to the tank volume and there is time for the operator to take action to stop the fill. In filling smaller tanks where the total filling time may be only 1 to 2 minutes, a delay of even a few seconds could result in an overfilled tank. Therefore the described manual method could not be used.

d. This method is only applicable to relatively small tanks, and to tanks that can readily be removed from any equipment with which they are used.

Any method which utilizes a valve or other mechanical equipment on the liquid feed line suffers from adverse effects of contaminants in the liquid feed. Because all the liquid goes through said valve or other mechanical equipment, contaminants tend to build up and in time cause a malfunction.

In view of these deficiencies, the various industries which deal with Class 2 liquids, i.e., liquids which must be handled and stored in a saturated or incipiently boiling state, are seeking improved methods of controlling the filling of tanks with these liquids. The ideal control method would have the following attributes:

The control method would automatically stop the fill at the correct point, without supervision by human operators or observers, and would automatically take into account normal and abnormal operating conditions.

The control method would be self-supervising so that in case of malfunction of one of the components of the control system a warning is given and the system automatically shuts down. If the malfunction is such that the tank currently being filled may be overfilled, a warning to that effect is given. In any case, the control system automatically refuses to fill further tanks until repairs have been made and the system has been reset by authorized service and repair personnel.

The equipment required to put the control method into practice would not be unduly expensive, and the use of the equipment would not complicate the tank filling process.

Usually the number of tanks to be filled is relatively large. Therefore to put the control method into use the component(s) required on or in each tank should in particular be very simple and inexpensive and should require little or no maintenance.

Any hardware should not have to handle all the liquid which is supplied to the tank, and therefore, because the hardware is handling relatively little liquid, there would be a reduced tendency to suffer malfunctions due to contaminants in the liquid.

SUMMARY OF THE INVENTION

The present invention provides automatic control of the filling of tanks with saturated or essentially saturated liquids. The apparatus and the method of the present invention have the following attributes:

1. There is no mechanical valve or other apparatus or appurtenance on the feed line to the tank being filled, with the following exception. The apparatus and the method of the present invention involve a microprocessor. The microprocessor receives information indicating when the tank has been correctly filled. At this time the microprocessor shuts off the flow of liquid to the tank, by closing a simple on/off valve which is located outside the tank, and well upstream of the tank, typically upstream of the fill hose which is connected to the tank during the filling process, or by shutting off the feed pump.

2. In different embodiments of the invention, different types of apparatus are permanently installed within the tank to be filled, or are permanently attached to the tank which is to be filled. In either case, the apparatus is simple, inexpensive, and extremely reliable.

3. The microprocessor contains suitable programming and receives information from sensors located in the dispensing system. There are no sensors in or on the tank which is being filled. On the basis of the information from the sensors, the microprocessor controls, monitors, and supervises the filling process. A filling process is started by a human operator or user of the filling equipment. The microprocessor stops the fill automatically when the tank has been filled to the correct level. The microprocessor stops the filling process immediately if an abnormal condition is indicated, on the basis of the information provided by the sensors, and utilizing the programming with which the microprocessor is equipped. Abnormal conditions which would cause the microprocessor to refuse to start or to immediately stop a filling process include but are not limited to:

an attempt to fill a tank which is already correctly filled sensor failure

A suitable warning is given in each case, and the control system does not allow further fills until the problem has been investigated and repaired, and the system reset by authorized personnel.

BRIEF DESCRIPTION OF THE DRAWINGS

A schematic of the simplest embodiment of the present invention is presented in FIG. 1.

In a slightly more complicated embodiment of the present invention, a float valve is used inside the tank being filled. Two embodiments of the float valve are shown in FIGS. 2 and 3. Additional embodiments of the invention are shown in FIGS. 4 and 5.

DETAILED DESCRIPTION OF THE INVENTION

Figure 1:
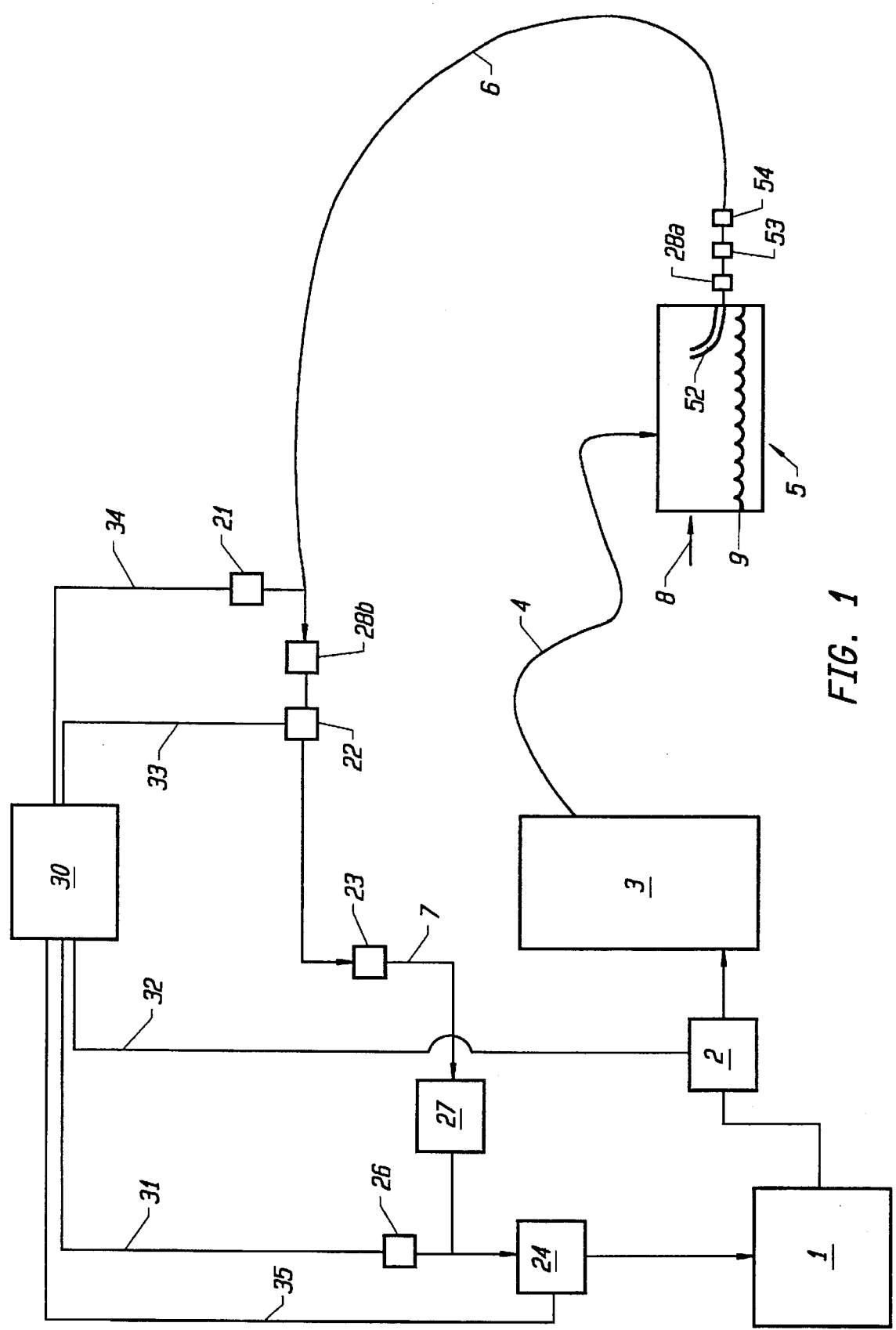

Referring to FIG. 1, the tank 5 is to be filled with liquid of Class 2, i.e., incipiently boiling or saturated liquid. The dispenser or other filling equipment 3 is supplied with liquid from supply tank 1 by pump 2. The pump could be within the dispenser 3 or could be at a different location. Various other liquid-handling appurtenances which are needed in the type of system sketched in FIG. 1 are well known to those skilled in the art and are not included in FIG. 1.

A key component in the apparatus and method of the present invention is a microprocessor or computer 30, which contains appropriate programming. The microprocessor 30 can be located within the dispenser 3 or elsewhere. The microprocessor receives information from sensors to be described later. The microprocessor performs all functions of the present invention and also performs various other functions, thus providing complete control, monitoring, and supervision of all aspects of the filling equipment and the filling process.

The liquid is supplied to tank 5 by fill hose 4 or by a fill pipe which takes the place of fill hose 4. There is a very small flow of vapor from the tank 5 which is being filled, back to the supply tank 1, during the filling process. This small flow of vapor can be termed the bleed, auxiliary, or signal flow. This vapor returns via line 6 from the tank 5. For clarity, the auxiliary hose 6 and the components attached to it are shown separate from the dispenser 3 in FIG. 1. However for convenience in installation these components may be placed within the dispenser 3 or at another suitable location in the supply/dispensing system.

The lines or hoses 4 and 6 could be combined into one package for ease of handling. A coaxial arrangement, a side by side arrangement, or other arrangement could be used. Or, the two lines 4 and 6 could be handled separately.

An additional length 7 of hose, tubing, or piping completes the return of the vapor to the supply tank 1.

During the filling process, there must be flow in the line 6 from the tank 5 which is being filled, ultimately to the supply tank 1.

In order for there to be flow, there must be a difference between the pressure in the vapor space in tank 5, and the pressure in the vapor space in tank 1.

In a given application of the apparatus and method of the present invention, if there is not an adequate pressure difference under all conditions, then a tank 27 must be used, as shown in FIG. 1. The pressure in the tank 27 is kept below the pressure in the vapor space in the tank 5 which is being filled. The required difference between the pressure in tank 5 and the pressure in tank 27 depends on the properties of the liquid being handled. Typically the pressure in tank 27 is maintained at a value which is on the order of one-half of the pressure in the tank 5.

The pressure in the tank 27 is higher than atmospheric in most cases but for ease of reference the tank is referred to as the vacuum tank. The compressor 24 takes vapor from the vacuum tank 27 and compresses it to the pressure in the supply tank 1, and moves this vapor to the supply tank. The pressure sensor 26 supplies information via the control wiring 31 to the microprocessor 30. The microprocessor operates the compressor 24 as necessary, via the control wiring 35, to maintain the required pressure in the vacuum tank 27.

In most applications the microprocessor has no direct information on the pressure in tank 5. Instead, the microprocessor receives information on ambient temperature and estimates the pressure in tank 5 on the basis of ambient temperature and pre-programmed information on the vapor pressure behavior of the liquid being handled.

In the remainder of the description of the present invention, it is assumed that the vacuum tank 27 and the compressor 24 must be used. If there is adequate pressure difference driving force without these components, the description to be presented below still applies, with very minor modifications that will be obvious to those skilled in the art.

The check valve 23 allows vapor flow only in the normal direction, i.e., from the tank 5 to the supply tank 1.

To begin a fill, the hoses or lines 4 and 6 are connected to the tank 5 which is to be filled. The method of connection of hose 6 is such that as soon as it is physically connected there is communication between the interior of hose 6 and the interior of tank 5. Equipment is commercially available for this purpose, as is well known to those skilled in the art, and is represented as the two mating halves 53 and 54 in FIG. 1. When the hose 6 is not connected to the tank 5, a device which is part of the mating half 53 which is permanently attached to tank 5, and a device which is part of the mating half 54 which is permanently attached to the end of hose 6, automatically close off the respective openings, so that there is no communication with the open air.

Mating halves similar in principle are used for hose 4 but are not shown in FIG. 1.

There are various possible sequences of events which follow upon connection of hose 4 to the tank 5. Regardless of which sequence of events occurs, the operation of the apparatus and method of the present invention is the same.

As one example of the sequence of events, a human operator may connect hose 4 to tank 5, and then open a valve (not shown in FIG. 1) at the end of hose 4. The human operator also connects hose 6 to tank 5. Or, there may be one filling connection which incorporates both lines 4 and 6.

Then the human operator operates a switch which in turn signals the microprocessor 30 to start the filling process. During a delay period of 1 to 2 seconds, the microprocessor carries out certain procedures to be described below. If all conditions are normal, the microprocessor activates the feed pump 2 to begin the fill, or otherwise starts the flow of liquid to the tank 5.

The flow of liquid to the tank is automatically stopped by the microprocessor, by stopping via the control wiring 32 the liquid feed pump 2, or by similarly closing an electrically-operated on/off valve (not shown), located upstream of the hose 4, when one of the following two events occurs:

the liquid in the tank reaches the maximum allowable level an abnormal condition is detected by the microprocessor The human operator then removes the hoses 4 and 6 from the tank 5. In the typical sequence previously described, the human operator at this point closes the valve at the end of hose 4. Upon removal of hose 6 from the tank 5, the said devices within the components 53 and 54 of the connection system automatically close, so that no vapor of the liquid being handled is released to ambient.

The key aspect of the apparatus and the method of the present invention is how the microprocessor determines when the liquid in the tank has reached the maximum allowable level.

The maximum allowable liquid level 8 in the tank 5 is indicated in FIG. 1. At some time during a typical filling operation, the liquid level may be at the intermediate position 9.

FIRST EMBODIMENT

As already noted, the auxiliary hose 6 is in no sense a full-fledged vapor return line. The auxiliary hose 6 has a very small inside diameter, typically 3 mm or ⅛ inch, and in addition there are two restrictors 28a and 28b in the flow path. These restrictors can be described in terms of the Cv concept which is well known to those skilled in the art. The Cv of a valve or other fitting is a number which expresses the resistance to flow offered by that fitting. A small number indicates that the fitting is more restrictive.

The Cv of each restrictor 28a and 28b is typically within the range 0.005 to 0.2. These values describe fittings which are extremely restrictive, in comparison with fittings which are met in everyday life, such as fittings in building water supply systems.

Due to the presence of the two restrictors 28a and 28b, the flow capacity of the auxiliary hose 6 is negligible in relation to the flow capacity of the fill hose 4, and in relation to the amount of material in tank 5. Furthermore, for the same reasons the flow capacity of the hose 6 is very small in relation to the flow capacity of a full-fledged vapor return line. Even if only one of the two restrictors 28a and 28b is present, as in other embodiments of the present invention, the flow capacity of the hose 6 is still very small.

There is a tube 52 installed within the tank 5. The tube 52 is identical to the tube widely used in current practice in the case of propane and similar fuels and is well known to those skilled in the art. When the liquid in the tank 5 reaches the maximum allowable level 8, liquid enters tube 52 and flows to the first restrictor 28a. This first restrictor 28a is preferably placed very close to the tank 5, and, along with the mating half 53, stays with the tank 5 at all times.

Continuing along the flow path of the auxiliary hose 6, there is a hose pressure sensor 21, a second restrictor 28b, and a sensor 22 which provides a signal via control wiring 33 indicating whether liquid or vapor is flowing in the line. As already noted, information from all sensors goes to a microprocessor or computer 30 which uses the information generally to monitor and control the tank filling operation and specifically to stop the filling operation when the tank 5 has been correctly filled.

Sensor 22 can operate on the basis of capacitance, conductivity, or other property to provide the required indication.

While the first restrictor 28a is preferably within a few millimeters of the exterior surface of the tank wall, the hose 6 can be several meters or more in length, so that the component 21, the second restrictor 28b, and component 22 are all several meters or more away from the tank which is being filled. The latter three components can be placed within the dispensing system 3 or at another convenient location.

The principle of the apparatus and method of the present invention is as follows. During the filling operation, vapor is leaving the tank 5 through the tube 52 and through the hose 6, and is flowing continuously to the vacuum tank 27. The compressor 24 then provides the motive power to move the vapor intermittently to the supply tank 1.

As an example, assume that during the filling operation, the pressure in the vapor space in tank 5 is 150 psia. The vacuum tank pressure is then maintained in the area of 75 psia.

When the liquid level reaches the maximum allowable level 8, liquid enters the tube 52 and immediately contacts the first restrictor 28a.

It is a fact of nature that with a given pressure difference, and with a given fitting with a given value of Cv, the rate of flow of liquid, in volumetric terms, is much less than the rate of flow of vapor, also in volumetric terms, measured at the pressure and temperature of the flowing vapor.

Therefore in theory when liquid contacts the first restrictor 28a, there is an immediate and strong reduction in the volume of material entering hose 6. Meanwhile the volume of material leaving hose 6 via the second restrictor 28b remains the same as it was throughout the filling operation.

Since in theory a much smaller volume is entering the hose, but the same volume is leaving, the hose pressure drops suddenly. This sudden drop in hose pressure is sensed by the pressure sensor 21, and the information is sent to the microprocessor 30 via the control wiring 34. When the microprocessor observes the sudden drop in hose pressure, the microprocessor knows that the maximum allowable liquid level has been reached, and the microprocessor stops the filling operation.

In practice, as liquid starts to flow through the first restrictor 28a, some of the liquid flashes to vapor, since the liquid is going into a region, the region between the two restrictors 28a and 28b, where the pressure is lower. If the flow were to continue for some time, the average amount of liquid which flashes to vapor would be minimal, because there is no heat source available to supply the heat of vaporization.

However in order to stop the filling procedure instantaneously when the liquid reaches the maximum allowable level, only a very small amount of liquid can be allowed to flow through the first restrictor 28a. For this small amount of liquid, the heat contained in the metal walls of the restrictor itself is enough to vaporize a significant amount of liquid.

Therefore the preferred method of putting the first embodiment of the present invention into practice is to use a first restrictor with a small value of Cv (more restrictive), and a second restrictor with a larger value of Cv (less restrictive). The pressure between the two restrictors is then much nearer to the pressure in the vacuum tank 27, than to the pressure in the tank 5 which is being filled.

In the example of tank 5 pressure 150 psia and tank 27 pressure 75 psia, the hose pressure in this method of operation may be on the order of 80 psia, as an example.

When the liquid level in the tank 5 which is being filled reaches the maximum allowable value, and liquid initially contacts the first restrictor 28a, the first small portion of liquid flowing through the restrictor enters a region where the pressure is much lower, and, in addition, there is plenty of heat available to vaporize this liquid. These two factors combine to produce a sudden increase of vapor flow into the hose, which results in an immediate and significant increase in hose pressure. This increase is sensed by the pressure sensor 21. The microprocessor receives the information that the hose pressure has suddenly increased, and on this basis immediately stops the fill.

It is important to emphasize that the apparatus and the method of the present invention do not require that the entire hose 6 should be filled with liquid. In a normal filling operation, liquid only gets as far as the first restrictor 28a and then the microprocessor immediately stops the filling operation.

The human operator then disconnects the hoses 4 and 6. As already discussed, devices located within the ends of the hoses automatically close when the hoses are disconnected, so that the interior spaces in the hoses do not communicate with ambient. In the case of hose 6, due to the continuous connection to the vacuum tank 27, and the ability of the compressor 24 to operate whenever the pressure in tank 27 rises, the pressure in the hose drops as soon as it is disconnected from tank 5. Any liquid in the hose immediately evaporates and the vapor flows to tank 27.

Between filling operations, if all equipment is in good condition, there is no leakage into hose 6 and, as a result, for long periods actual operation of the compressor is not necessary.

When a new filling operation starts, as already noted there is a delay period while the microprocessor makes various system checks, before starting the flow of liquid to tank 5. The most important of these checks is to ascertain that the hose 6 has been properly connected to the tank 5 which is to be filled. When the hose 6 is connected, the hose pressure immediately rises to a level above the value which existed between filling operations. In this way the microprocessor determines that the hose 6 has been connected, and that it is permissible to start the fill.

If there is a failure of pressure sensor 21, and if the fill continues after the liquid level reaches the maximum allowable value 8 in FIG. 1, liquid travels through the hose 6 and contacts the liquid/vapor sensor 22. Upon receiving a "liquid" signal from sensor 22, the microprocessor immediately stops the fill and provides a warning that there is a system problem requiring repair. Thus the sensor 22 provides a backup to the sensor 21 which is the basis for normal operation.

If a tank is presented for filling and the tank is already full, at the start of the fill the hose pressure rises in the same way as for a normal fill. Therefore the microprocessor allows the fill to begin. However liquid immediately travels through hose 6 and contacts the sensor 22 whereupon the fill is stopped immediately.

SECOND EMBODIMENT

Figure 2:
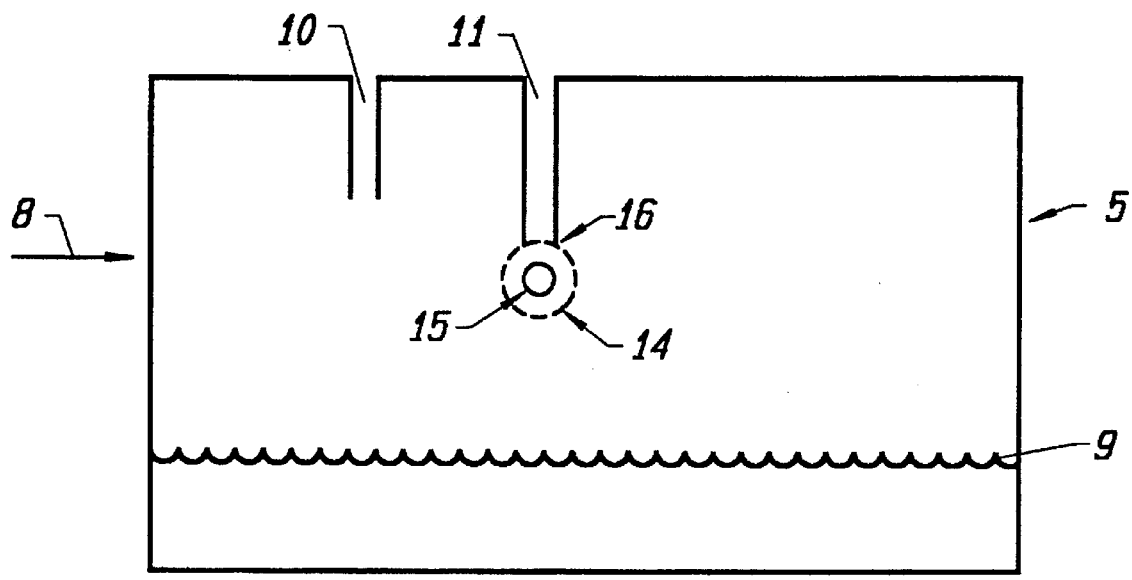

A second embodiment of the apparatus and method of the present invention utilizes a more sophisticated arrangement inside the tank being filled. Instead of the tube 52, there is a float valve inside the tank as shown in FIG. 2. When the liquid level rises to the maximum allowable value 8 in FIG. 2, the float 15 which is within the cage 14 rises to seal against the seat 16.

With the float valve of FIG. 2 rather than the tube 52 of FIG. 1, the first restrictor 28a of FIG. 1 is not needed. The operation is then as follows.

During the filling operation, vapor flows out of the tank through the opening 16 and the tube 11 of FIG. 2. The vapor then flows through the mating halves 53 and 54 of FIG. 1 and through hose 6 and then to components 21, 28b and 22 of FIG. 1, as in the previous discussion.

During the normal part of the fill, while the liquid level 9 is below the maximum allowable value 8, the pressure in hose 6 is the same as the pressure in the vapor space in tank 5. As an example, using the same numerical values as in the previous example, the hose pressure is 150 psia and the pressure downstream of the restrictor 28b is 75 psia.

When the liquid level rises to the maximum value 8, and the float 15 seals against the seat 16, the supply of vapor to the hose 6 is cut off and the pressure in hose 6 drops precipitously. The drop in pressure is sensed by the pressure sensor 21. The information is conveyed via the control wiring 34 to the microprocessor 30, and the microprocessor immediately stops the fill.

The advantage of the float valve of FIG. 2 over the tube 52 of FIG. 1 is that the fact that the liquid level has reached the maximum allowable value is sensed one or two seconds sooner, and there is no need for even the smallest amount of liquid to leave the tank.

The same effect could be obtained in the first embodiment by installing the first restrictor 28a at the tip of the tube 52, inside the tank. However the restrictor would not be readily accessible for repair or replacement. After long service the restrictor may become fouled by debris in the liquid. The float valve of FIG. 2 is more resistant to fouling.

The float valve of FIG. 2 provides an additional level of backup in that with use of the float valve, if liquid reaches the sensor 22 a warning can be given that the float valve is defective and must be repaired or replaced. The warning also indicates that the tank may be overfilled and the contents should be used immediately, or the tank should be emptied immediately. Interpretation of the significance of liquid reaching sensor 22 is thus much easier than in the case of use of tube 52 (FIG. 1).

In order to ensure detection of the most hazardous condition, namely liquid appearing in the vapor return line, duplicate sensors 22 can be used, each with its own circuitry. If the microprocessor at any time observes any difference in the signals produced by the two sensors, the dispensing equipment is immediately shut down for repair.

Abnormal operation—tank already filled

Assume that a tank is presented to be filled but the tank is already filled to the maximum allowable liquid level. The following discussion is based on the assumption that the float 15 in the apparatus 11 is working properly.

When the hose 6 is connected to the tank 5 to be filled, the pressure in hose 6 does not rise above the vacuum tank pressure. Or, the pressure may rise slightly due to vapor or liquid trapped between the float 15 and the mating half 53, and then immediately drop again. Generally, the microprocessor does not allow a fill to start if the hose pressure does not rise. So if the tank is already full, in the second embodiment the microprocessor does not start the fill. This is another advantage over the first embodiment. In the first embodiment, if the tank is already full, the microprocessor allows the fill to start and to continue for on the order of 5 seconds before determining that the fill should be stopped.

An override is used to accommodate a brand new tank in which there is no liquid and therefore in which the pressure is low. When the hose 6 is connected, the hose pressure does not rise. Without the override, the microprocessor would not allow the fill to begin.

The override is operable by authorized personnel only and allows dispensing of a small quantity of liquid, typically 1 L. This small fill is completed and then a new fill is started. The standard procedure is followed in this new fill.

Automatic Temperature Compensation

Figure 3:
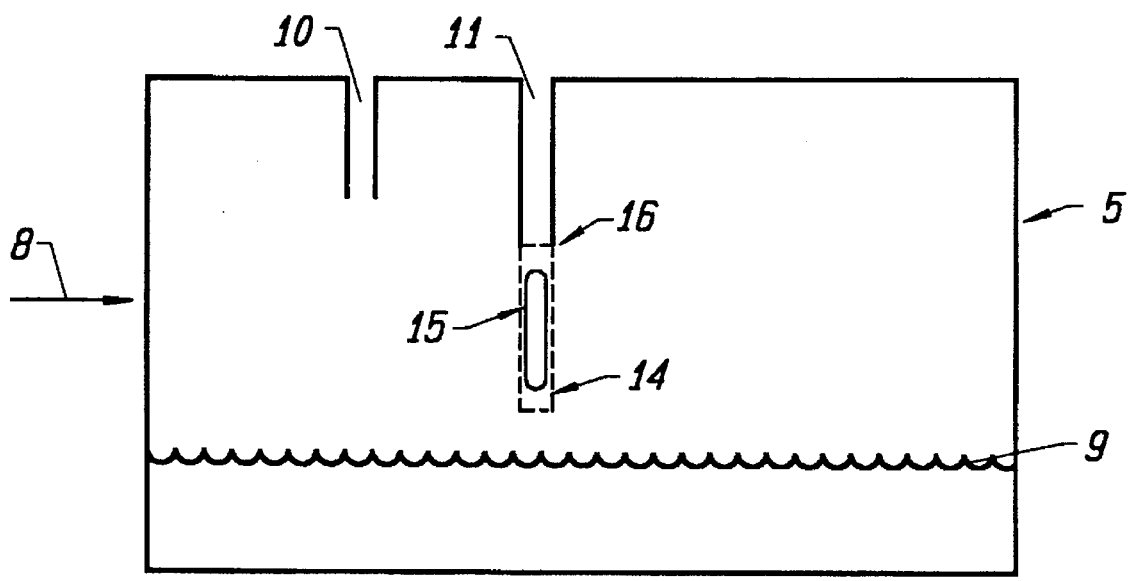

In FIG. 3 is shown another embodiment of the apparatus shown in FIG. 2. In FIG. 3 the float 15 is a relatively long hollow tube, maintained in a vertical or nearly vertical position.

Any type of float rides higher with respect to the surface of the liquid, if the liquid is denser. The relatively long hollow tube used as a float in FIG. 3 provides a relatively greater movement with respect to the surface of the liquid, as the liquid density changes, as compared to a float with a smaller total height. This fact is taken advantage of in the following way.

As described earlier, the concern with tanks which contain saturated liquids is that if the liquid becomes warmer it expands and may fill the tank completely. Any further expansion would develop tremendous forces within the tank which would cause it to rupture.

If the liquid which is supplied to a tank is already warm, there is less chance of a large thermal expansion which would fill the tank. Therefore, when the liquid is warm, the allowable liquid level in the tank is higher. As already noted, any float rides higher when the liquid is denser and lower when the liquid is less dense. Any float used in the apparatus shown in FIG. 2 or FIG. 3 thus contacts the seat 16 sooner when the liquid is denser and later when the liquid is less dense, as the liquid level rises in the tank. Therefore the tendency of the apparatus shown in the said Figures is to allow a higher liquid level when the liquid is less dense, which is exactly the behavior that is wanted.

The increase in projection of the top of the float above the liquid surface, for a given change in density, is directly proportional to the total height of the float. By appropriate selection of the total height of the float 15 of FIG. 3, it is possible to approach the ideal behavior which is that the tank filling process is stopped when the mass of liquid in the tank reaches a pre-determined value, this value being independent of the temperature of the flowing liquid in the dispensing system 3 of FIG. 1.

THIRD EMBODIMENT

Figure 4:
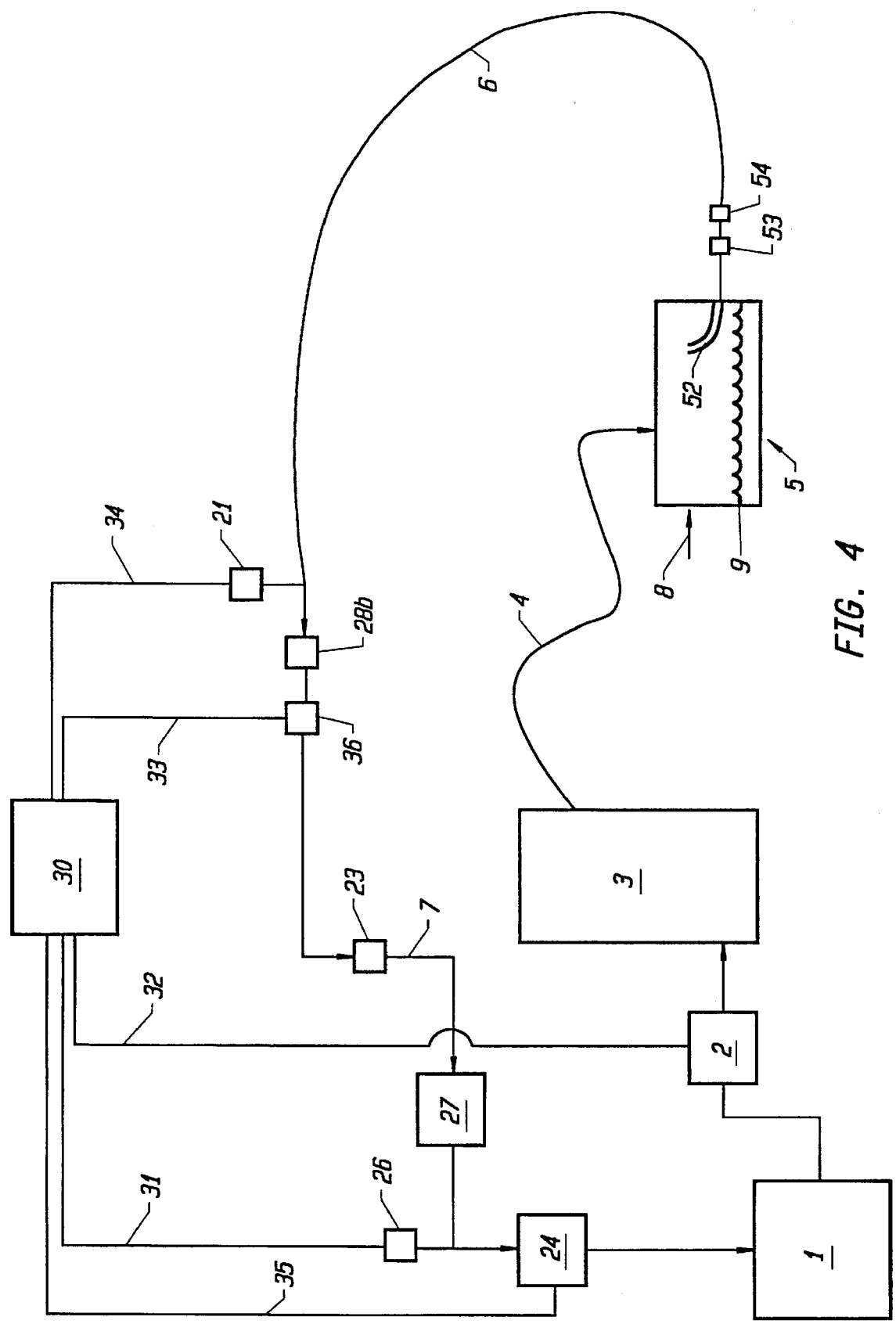

A third embodiment of the apparatus and method of the present invention is shown in FIG. 4.

In this embodiment, there is only one restrictor 28b in the auxiliary, bleed or signal line 6. The pressure in the line 6 while tank 5 is being filled is identical to the pressure in the vapor space in tank 5. There is a temperature sensor 36 immediately downstream of the restrictor 28b.

The operation of this embodiment is as follows. When the liquid level in the tank 5 reaches the maximum allowable value, liquid begins to flow through the tube 52 and the line 6. The liquid reaches the restrictor 28b. There is a significant pressure difference across the restrictor 28b, due to the operation of the pump or compressor 24 in maintaining a relatively low pressure in the tank 27. When the liquid passes through the restrictor 28b and enters the lower pressure region downstream of this region, a significant portion of the liquid flashes to vapor, which produces a marked cooling effect. The reduction in temperature is sensed by the sensor 36. Information from this sensor is sent to the microprocessor 30 via the control wiring 33. When the microprocessor receives information indicating a marked drop in temperature, the microprocessor immediately acts to stop the supply of liquid to the tank 5, exactly as in connection with the first and second embodiments.

The pressure sensor 21 is utilized to indicate to the microprocessor that the signal line 6 has been connected to the tank 5. Only when the line 6 has been connected to the tank 5 will the microprocessor allow a filling procedure to begin.

FOURTH EMBODIMENT

Figure 5:
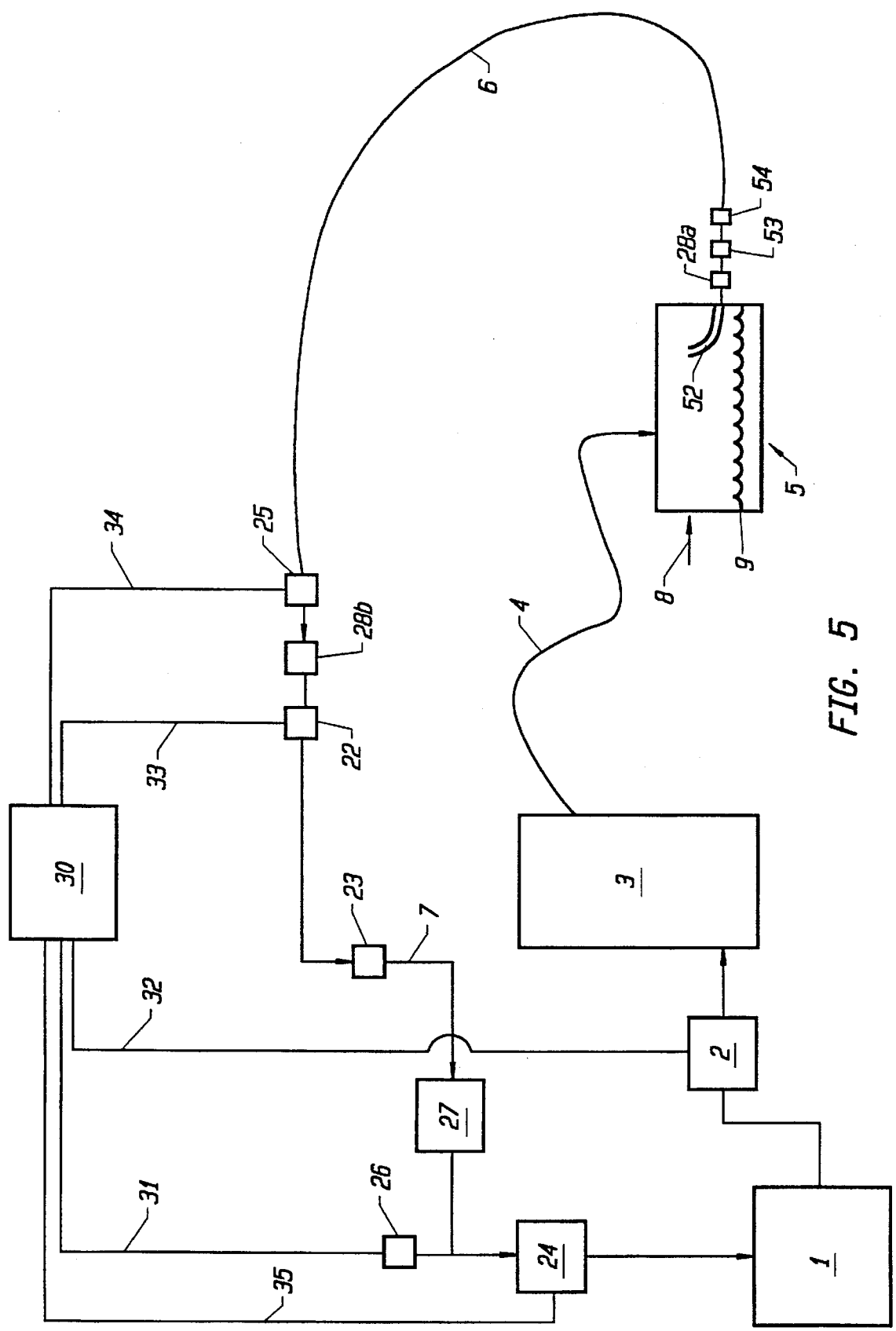

A fourth embodiment of the apparatus and method of the present invention is presented in FIG. 5.

This embodiment is very similar to the first and second embodiments with the exception of the presence of a flow meter 25. This flow meter responds to the actual volume of vapor or liquid passing through it. During the normal part of the fill, while the liquid level 9 is well below the maximum allowable value 8, vapor flows through the line 6 at a flow rate determined by the flow resistance of the restrictors 28a and 28b, and by the pressures in the system. A corresponding signal is sent to the microprocessor 30 via the control wiring 34.

When the liquid level reaches the maximum allowable value 8, and liquid goes on to contact the first restrictor 28a, the volumetric flow rate through the line 6 immediately increases markedly as described in connection with the first embodiment. This change in conditions, in this case a change in volumetric flow rate, is communicated to the microprocessor exactly as in the other embodiments, whereupon the microprocessor acts to stop the filling procedure.

It should be noted that in normal operation liquid does not have to fill the entire line 6. As soon as liquid first contacts the first restrictor 28a, the volumetric flow rate changes and the microprocessor receives a strong indication that the filling procedure should be stopped.

If by any chance the flow meter 25 fails, liquid fills the line 6 and reaches the liquid/vapor sensor 22. This sensor acts as a backup and sends information to the microprocessor which causes the microprocessor to stop the filling procedure immediately.

Before any filling procedure starts, the line 6 must be connected to the tank 5 which is to be filled, as already discussed in connection with the other embodiments. As soon as line 6 is thus connected, there is flow through the line 6 and through the flowmeter 25. The microprocessor must see a signal indicating that there is flow, before allowing the filling procedure to begin.

General Comment

The embodiments of the present invention as described herein are related as follows:

The embodiments require a pressure difference so that there is an auxiliary or bleed flow in hose 6. In most applications the pressure difference is created by maintaining, through use of vapor compressor 24, a lower pressure in the vacuum tank 27.

In some applications, the action of the feed pump 2 boosts the pressure in the vapor space in tank 5 so that it is greater than the pressure in tank 1. Then the vacuum tank 27 and compressor 24 are not needed.

The first and second embodiments determine that the tank 5 has been filled correctly by noting a sudden change in hose pressure as sensed by pressure sensor 21.

In the first embodiment, in the very rare and unusual circumstance that the computer misses the change in pressure in hose 6, the filling operation continues and liquid flows through hose 6 and reaches the vapor/liquid sensor 22. Upon receiving a signal that liquid is present, the computer stops the filling operation.

Thus there is a backup or second detection method to determine when the tank has been correctly filled. Although as already implied most fills are stopped as soon as liquid reaches the first restrictor 28a, because of the small internal volume of hose 6 only 2 to 3 seconds are required for liquid to reach sensor 22. Therefore, the delay before the filling procedure is stopped is minimal.

In any embodiment, there may be a length of hose or tubing between the tank and the mating half 53 in FIG. 1. This length of hose or tubing could contain liquid, even if the tank, when presented for filling, contains very little liquid. At the start of the fill this liquid moves through hose 6 and while much of it may evaporate some liquid could still contact sensor 22 (sensor 36 in the third embodiment, FIG. 4). The microprocessor is programmed to disregard during the first few seconds of the fill any indication of liquid. The amount of liquid can be minimized by ensuring that any hose or tubing upstream of the mating half 53 has a very small inside diameter.

Also in any embodiment, after the first few seconds of the fill, the microprocessor shuts off the flow of liquid to tank 5, if liquid is still being sensed by sensor 22 (sensor 36 in the third embodiment). In the first, third, and fourth embodiments, this observation indicates that the tank presented for filling already contains the maximum allowable amount of liquid. In the second embodiment, this observation indicates that the tank is already full and also indicates that the float valve is defective. A warning is provided that repair is required.

Test Results

The embodiment shown in FIG. 1 of the apparatus and method of the present invention was tested repeatedly with water and air to represent respectively liquid and vapor of Class 2 materials (as described in "Background" above), in the theoretical situation in which there is minimal vaporization as liquid passes through the first restrictor. As discussed in connection with the first embodiment, this situation applies if the flow of liquid is somewhat prolonged so that there is not enough heat available for significant vaporization.

In the test work, the pressure in the city water system, rather than a liquid feed pump, provided the motive force for liquid flow to the test tank. Downstream of the second restrictor 28b, the water and air were released to ambient. The two restrictors had approximately equal Cv values (approximately 0.02 in each case).

At the start of a typical test, city water at a pressure of 75 psia was supplied to the tank 5. Air was forced out of tank 5 and flowed through the first and second restrictors 28a and 28b and then to ambient. The hose pressure was typically 45 psia. When water contacted the first restrictor 28a, the hose pressure immediately dropped to 15 psia (essentially ambient pressure). In the test work, the water flow was not stopped at this time. Water flow was allowed to continue, in order to observe all aspects of system behaviour. After a few seconds, hose pressure rose again to about 40 psia, and soon after water was seen to issue from the downstream end of the second restrictor 28b.

The first embodiment of the present invention was also operated using propane as an example of a Class 2 liquid. As in the testing with water and air, the object of the work with propane was to investigate the behavior of the pressure in the hose 6 in FIG. 1. The filling procedure was stopped manually, rather than using microprocessor control, when the hose pressure underwent an appropriate change. Also as in the work with water and air, for test purposes only, the propane vapor leaving the second restrictor was released to ambient.

The Cv values of the first and second restrictors were in relation to each other by a factor of approximately three. The first restrictor was more restrictive (lower Cv value).

In the first test, the pressure in the tank 5 containing liquid and vapor propane was approximately 57 psia. The first restrictor 28a had a Cv value of 0.0064 and the second restrictor 28b had a Cv value of 0.02. During vapor flow the hose pressure was 40 psia. When liquid contacted the first restrictor 28a, the hose pressure immediately climbed to 47 psia. No liquid was supplied to tank 5 after this pressure increase was observed. The amount of liquid in the hose 6 was found to be minimal, indicating that the pressure response occurred in a timely manner.

The test was repeated six times with essentially the same pressure values obtained each time. Operation appeared to be reliable and repeatable.

Different conditions were then instituted such that the Cv value of the first restrictor was 0.02 and the Cv value of the second restrictor was again larger by a factor of approximately three. In the first test with this arrangement, the tank pressure was 53 psia and during vapor flow the hose pressure was essentially equal to atmospheric pressure (14.7 psia). When liquid contacted the first restrictor 28a, the hose pressure immediately climbed to 20 psia. No liquid was supplied to tank 5 after this pressure increase was observed. The amount of liquid in the hose 6 was again found to be minimal, indicating that the pressure response occurred in a timely manner.

This test was repeated four additional times with virtually identical results, except for one case. In this case, there was no pressure increase at a time when it was believed liquid was reaching the first restrictor 28a. It was not certain that liquid was entering the hose, however, and the case was not investigated further, because it is believed that it is preferable to have a somewhat larger pressure drop across the second restrictor than was the case in this series of tests, during vapor flow.

Two additional tests were carried out, in each case with the same first restrictor with Cv of 0.02. The second restrictor was variable and was adjusted so that the preferable somewhat larger pressure drop was achieved across the second restrictor during vapor flow. A variable restrictor was used for convenience in testing. In actual field application, fixed restrictors are used, to ensure correct adjustment and therefore correct performance.

The tank pressure was again 53 psia and in the first of these tests the hose pressure during vapor flow was 27 psia. When liquid contacted the first restrictor, the hose pressure rose to 37 psia. In the second test the hose pressure during vapor flow was 31 psia and when liquid contacted the first restrictor the hose pressure rose to 40 psia.

Again in these tests the pressure signal was timely on the basis that no significant amount of liquid entered the hose 6.

Note that in the above tests the propane vapor leaving the second restrictor was released to ambient. Therefore the effective "tank 27 pressure" was 14.7 psia. The ratio of tank 5 pressure to "tank 27 pressure" was typically greater than three.

In order to test the first embodiment of the present invention with a lower value of the ratio tank 5 pressure/ "tank 27 pressure", a back pressure regulator was used instead of an actual tank 27. The back pressure regulator was placed downstream of the second restrictor 28b, and maintained a constant pressure downstream of this restrictor, regardless of variations in vapor flow rate.

Several additional tests were carried out, using propane, with this arrangement.

The outdoor temperature was 10° F. at which temperature the vapor pressure of propane is 46 psia. The pressure in the tank 5 which was being filled was not measured but was assumed to be approximately 46 psia. The pressure downstream of the second restrictor was maintained at 24 psia, which was approximately 52% of the pressure in the tank 5 which was being filled, i.e., the above-mentioned ratio was approximately 46/24=1.9.

The Cv values of the first and second restrictors were approximately the same as in the previous set of propane tests, so that during vapor flow the bulk of the pressure drop again occurred across the first restrictor. The "hose pressure", i.e., the pressure between the first and second restrictors, was approximately 26 psia. Therefore the pressure drop across the second restrictor was approximately 2 psi.

When the liquid level in the tank 5 being filled reached the maximum allowable value and liquid consequently contacted the first restrictor, the hose pressure rose sharply to 29 psia whereupon no further liquid was supplied to tank 5. The test was repeated with the same results.

While a strong signal was received in these tests, an even more sensitive indication would be received by use of a differential pressure sensor, to sense the pressure differential across the second restrictor. During normal vapor flow, the pressure difference was 2 psi as noted above. When liquid contacted the first restrictor, the pressure difference across the second restrictor more than doubled to 5 psi. This large change in magnitude can be readily picked up by an inexpensive differential pressure sensor. A highly sensitive and highly accurate sensor is not needed.

I claim:

1. A method for filling a tank with a saturated liquid, said tank having an inlet, and an outlet including a first flow restrictor, said first flow restrictor being mounted so as to be exposed to the gaseous phase associated with said saturated liquid until the liquid in said tank attains the pre-determined maximum allowable level, said method including the steps of:

i) fluidly connecting said outlet with a lower pressure region through a vent line, said lower pressure region being created in a reduced-pressure reservoir connected to a pump or compressor reacting to the pressure in said reduced-pressure reservoir to pump fluid from said reduced-pressure reservoir when the pressure in said reduced-pressure reservoir exceeds a pre-determined maximum level, said vent line having a second flow restrictor therein downstream of said first flow restrictor, and said first and second flow restrictors being selected to yield, in said vent line, a fluid pressure below the pressure in said tank and above the pressure in said lower pressure region as long as said first flow restrictor is exposed to said gaseous phase;

ii) introducing said saturated liquid into said tank through said inlet; and iii) ceasing said introduction of said saturated liquid into said tank when said fluid pressure changes indicating that said liquid has reached said pre-determined maximum allowable level in said tank and consequently has contacted said first flow restrictor.

2. A method for filling a tank with a saturated liquid, said tank having an inlet, and an outlet including a first flow restrictor, said first flow restrictor being mounted so as to be exposed to the gaseous phase associated with said saturated liquid until the liquid in said tank attains the pre-determined maximum allowable level, said method including the steps of:

i) introducing said saturated liquid into said tank through said inlet by pumping from a supply tank;

ii) fluidly connecting said outlet with a lower pressure region through a vent line, said lower pressure region being created in a reduced-pressure reservoir connected to a pump or compressor reacting to the pressure in said reduced-pressure reservoir to pump fluid from said reduced-pressure reservoir when the pressure in said reduced-pressure reservoir exceeds a pre-determined maximum level, said pump or compressor discharging into said supply tank, said vent line having a second flow restrictor therein downstream of said first flow restrictor, and said first and second flow restrictors being selected to yield, in said vent line, a fluid pressure below the pressure in said tank and above the pressure in said lower pressure region as long as said first flow restrictor is exposed to said gaseous phase; and iii) ceasing said introduction of said saturated liquid into said tank when said fluid pressure changes indicating that said liquid has reached said pre-determined maximum allowable level in said tank and consequently has contacted said first flow restrictor.

3. An apparatus for filling a tank with a saturated liquid, said apparatus comprising:

i) a saturated liquid supply capable of providing saturated liquid at a pressure adequate to ensure flow of said liquid into said tank;

ii) a first fluid conduit connectable between said supply and said tank to allow fluid communication therebetween;

iii) a reduced-pressure region having a pressure lower than the pressure in the vapor space in said tank which is filled, said reduced-pressure region being created in a reduced-pressure reservoir connected to a pump or compressor reacting to the pressure in said reduced-pressure reservoir to pump fluid from said reduced-pressure reservoir when the pressure in said reduced-pressure reservoir exceeds a pre-determined maximum level;

iv) a second fluid conduit connectable between said tank and said reduced-pressure region to allow fluid communication therebetween;

v) first and second flow restrictors positioned in said second fluid conduit, said second fluid flow restrictor being downstream from said first fluid flow restrictor, said first and second fluid flow restrictors being selected to yield a pressure therebetween in said second fluid conduit greater than that in said reduced-pressure region and less than the pressure in said vapor space in said tank as long as vapor is passing from said tank into said first fluid flow restrictor, said first fluid flow restrictor reacting to the liquid level in said tank to significantly change the characteristics of the fluid flow therethrough when the liquid level in said tank approaches the predetermined allowable maximum; and vi) a fluid dispensing control for stopping fluid flow through said first fluid conduit in response to a significant change in pressure in said second fluid flow conduit.

4. A method for filling a tank with a saturated liquid, said tank having an inlet, and an outlet including a first flow restrictor, said first flow restrictor being mounted so as to be exposed to the gaseous phase associated with said saturated liquid until the liquid in said tank attains the pre-determined maximum allowable level, said method including the steps of:

i) fluidly connecting said outlet with a lower pressure region through a vent line, said vent line having a second flow restrictor therein downstream of said first flow restrictor, said first and second flow restrictors being selected to yield, in said vent line, a fluid pressure below the pressure in said tank and above the pressure in said lower pressure region as long as said first flow restrictor is exposed to said gaseous phase;

ii) introducing said saturated liquid into said tank through said inlet;

iii) ceasing said introduction of said saturated liquid into said tank when said fluid pressure changes indicating that said liquid has reached said pre-determined maximum allowable level in said tank and consequently has contacted said first flow restrictor; and iv) creating said lower pressure region in a reduced-pressure reservoir connected to a pump or compressor reacting to the pressure in said reduced-pressure reservoir to pump fluid from said reduced-pressure reservoir when the pressure in said reduced-pressure reservoir exceeds a pre-determined maximum level, said lower pressure region being produced in a dry reservoir tank, said lower pressure region resulting from evacuation of said reservoir tank by a pump or compressor which discharges into said supply.

5. An apparatus for filling a tank with a saturated liquid, said apparatus comprising:

i) a saturated liquid supply capable of providing saturated liquid at a pressure adequate to ensure flow of said liquid into said tank;

ii) a first fluid conduit connectable between said supply and said tank to allow fluid communication therebetween;

iii) a reduced-pressure region having a pressure lower than the pressure in the vapor space in said tank which is filled, said reduced-pressure region being created in a reduced-pressure reservoir connected to a pump or compressor reacting to the pressure in said reduced-pressure reservoir to pump fluid from said reduced-pressure reservoir when the pressure in said reduced-pressure reservoir exceeds a pre-determined maximum level, said reduced-pressure region being produced in a dry reservoir tank, said reduced-pressure region resulting from evacuation of said reservoir tank by a pump or compressor which discharges into said supply;

iv) a second fluid conduit connectable between said tank and said reduced-pressure region to allow fluid communication therebetween;

v) first and second flow restrictors positioned in said second fluid conduit, said second fluid flow restrictor being downstream from said first fluid flow restrictor, said first and second fluid flow restrictors being selected to yield a pressure therebetween in said second fluid conduit greater than that in said reduced-pressure region and less than the pressure in said vapor space in said tank as long as vapor is passing from said tank into said first fluid flow restrictor, said first fluid flow restrictor reacting to the liquid level in said tank to significantly change the characteristics of the fluid flow therethrough when the liquid level in said tank approaches the predetermined allowable maximum; and vi) a fluid dispensing control for stopping fluid flow through said first fluid conduit in response to a significant change in pressure in said second fluid flow conduit.

6. A method for filling a tank with a saturated liquid, said tank having an inlet, and an outlet including a first flow restrictor, said first flow restrictor being mounted so as to be exposed to the gaseous phase associated with said saturated liquid until the liquid in sail tank attains the pre-determined maximum allowable level, said method including the steps of:

i) fluidly connecting said outlet with a lower pressure region through a vent line, said vent line having a second flow restrictor therein downstream of said first flow restrictor, said first and second flow restrictors being selected to yield, in said vent line, a fluid pressure below the pressure in said tank and above the pressure in said lower pressure region as long as said first flow restrictor is exposed to said gaseous phase;

ii) introducing said saturated liquid into said tank through said inlet;

iii) monitoring said fluid pressure in said vent line between said first and second flow restrictors with a pressure sensor which solely detects the pressure level between said restrictors; and iv) ceasing said introduction of said saturated liquid into said tank when said fluid pressure changes indicating that said liquid has reached said pre-determined maximum allowable level in said tank and consequently has contacted said first flow restrictor.

7. An apparatus for filling a tank with a saturated liquid, said apparatus comprising:

i) a saturated liquid supply capable of providing saturated liquid at a pressure adequate to ensure flow of said liquid into said tank;

ii) a first fluid conduit connectable between said supply and said tank to allow fluid communication therebetween;

iii) a reduced-pressure region having a pressure lower than the pressure in the vapor space in said tank which is filled;

iv) a second fluid conduit connectable between said tank and said reduced-pressure region to allow fluid communication therebetween;

v) first and second flow restrictors positioned in said second fluid conduit, said second fluid flow restrictor being downstream from said first fluid flow restrictor, said first and second fluid flow restrictors being selected to yield a pressure therebetween in said second fluid conduit greater than that in said reduced-pressure region and less than the pressure in said vapor space in said tank as long as vapor is passing from said tank into said first fluid flow restrictor, said first fluid flow restrictor reacting to the liquid level in said tank to significantly change the characteristics of the fluid flow therethrough when the liquid level in said tank approaches the predetermined allowable maximum;

vi) a pressure monitor for monitoring pressure in said second fluid conduit which is a pressure sensor that solely detects the pressure level between said restrictors; and vii) a fluid dispensing control connected to and receiving input from said pressure monitor for stopping fluid flow through said first fluid conduit in response to a significant change in pressure in said second fluid conduit.

* * * * *